United States Patent [19]

Bundo et al.

[11] Patent Number: 5,457,949
[45] Date of Patent: Oct. 17, 1995

[54] STEEL CORDS FOR ELASTOMER ARTICLES AND PNEUMATIC RADIAL TIRES USING THE SAME

[75] Inventors: Motonori Bundo, Higashimurayama; Kazuma Morotomi, Kodaira, both of Japan

[73] Assignee: Bridgestone Corporation, Tokyo, Japan

[21] Appl. No.: 408,171

[22] Filed: Mar. 22, 1995

Related U.S. Application Data

[63] Continuation of Ser. No. 46,810, Apr. 16, 1993, abandoned.

[30] Foreign Application Priority Data

| Apr. 17, 1992 | [JP] | Japan | 4-097937 |
| Apr. 17, 1992 | [JP] | Japan | 4-097939 |
| Apr. 17, 1992 | [JP] | Japan | 4-097940 |
| Apr. 17, 1992 | [JP] | Japan | 4-097941 |
| Apr. 17, 1992 | [JP] | Japan | 4-097943 |
| Jul. 24, 1992 | [JP] | Japan | 4-198607 |

[51] Int. Cl.$^6$ .................................................. D02G 3/48
[52] U.S. Cl. ............................................. 57/212; 57/902
[58] Field of Search .......................... 57/210, 212, 223, 57/902

[56] References Cited

U.S. PATENT DOCUMENTS 2,605,201  7/1952  Howe .......................... 57/902 X
4,738,096  4/1988  Hatakeyama et al. .
4,836,262  6/1989  Nishizawa et al. .
5,323,595  6/1994  Mizuta et al. ..................... 57/212

FOREIGN PATENT DOCUMENTS 0462716  12/1991  European Pat. Off. .
462716   12/1991  European Pat. Off. ............... 57/902
2476548  8/1981   France .
2609736  7/1988   France .
246886   12/1985  Japan ................................. 57/212
2081765  2/1982   United Kingdom .

OTHER PUBLICATIONS

Patent Abstracts of Japan, vol. 11, No. 310 (M-630) 9 Oct. 1987.

Primary Examiner—Joseph J. Hail, III
Attorney, Agent, or Firm—Sughrue, Mion, Zinn, Macpeak & Seas

[57] ABSTRACT

A steel cord of 1+3 structure is formed by twisting three sheath steel filaments around a single core steel filament. In this case, the three sheath steel filaments are arranged so as to satisfy conditions at a section of the sheath perpendicular to a longitudinal direction of the cord that a maximum angle of a triangle formed by connecting central points of the these filaments to each other is not less than 90° but less than 180° and an apex defining the maximum angle is always located on the same filament and a distance between the central point of this filament and the central point of the filament adjacent thereto is 1.0–1.3 times of the diameter of the filament.

7 Claims, 3 Drawing Sheets

FIG_1
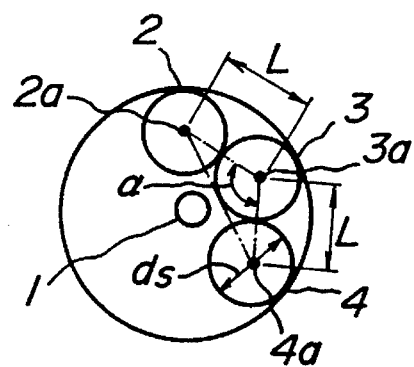
FIG_2
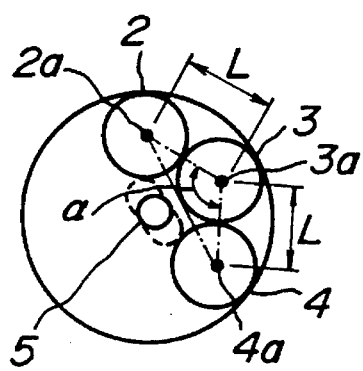
FIG_3
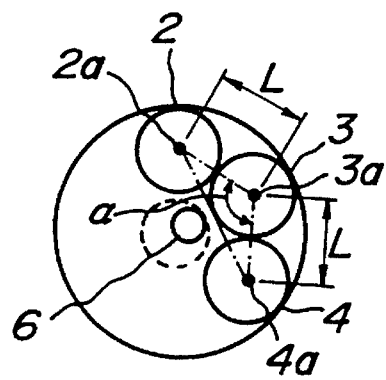

FIG_4
PRIOR ART
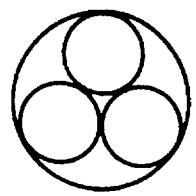
FIG_5
PRIOR ART
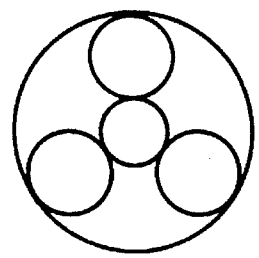
FIG_6
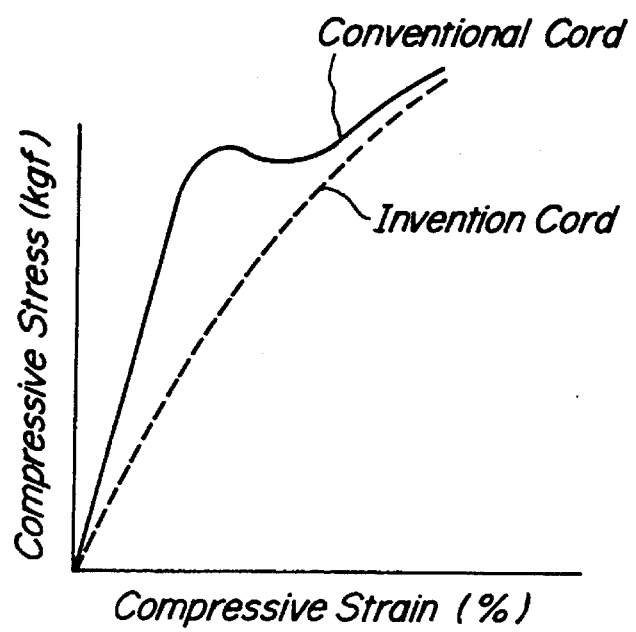

5,457,949

STEEL CORDS FOR ELASTOMER ARTICLES AND PNEUMATIC RADIAL TIRES USING THE SAME

This is Continuation of application Ser. No. 08/046,810, filed Apr. 16, 1993 now abandoned.

BACKGROUND OF THE INVENTION

1. Field of the Invention

This invention relates to steel cords used as a reinforcement of elastomer articles such as a pneumatic tire, industrial belt and the like as well as pneumatic radial tires using such steel cords. More particularly it relates to steel cords having improved resistance to cord breakage.

2. Description of the Related Art

Steel cords have become widely used for the re-inforcement of various elastomer articles. For example, steel cords formed by twisting 4–5 steel filaments or so-called steel cords of 1×4 or 1×5 structure are used for the reinforcement of pneumatic tires. Lately, it is strongly demanded to reduce the weight of the tire in order to attain low fuel consumption of a vehicle and the cost of the tire. In order to satisfy this demand, the use steel cords of 1×3 or 1×2 structure has started.

These steel cords of 1×3 or 1×2 structure are constituted by merely decreasing the number of steel filaments used, so that when they are used in a belt of the tire, in order to obtain a proper belt strength, it is required to thicken the steel filament used. However, when excessive input is applied to the tire during the cornering of the tire, a so-called buckling deformation is caused in a ground contact portion of the tire located opposite to the cornering direction to buckle the cords used for the reinforcement of the tire. Hence compressive stress is applied to these cords and finally cord breakage occurs. This phenomenon becomes conspicuous in case of using a thick filament.

In order to avoid such a cord breaking phenomenon, it is attempted to add a new reinforcing member before tire build-up, which largely obstructs the reduction of tire weight and cost, so that merits by using steel cords of 1×3 or 1×2 structure in the reinforcement are considerably lowered.

As to the steel cord of 1×3 structure, Japanese Patent Application Publication No. 3-29914 discloses a structure where a steel filament is removed out from the steel cord of 1×4 structure to leave the resulting space as it is. Such a cord is considered to exhibit good properties when the compressive stress is applied to the cord. However, the latter cords should maintain the cord arrangement of 1×4 structure in form of 1×3 structure, but it is very difficult to hold such a form even after the tire building conducted under a high stress such as tire vulcanization or the like. Hence the use of the cords disclosed in this literature is impossible in an industrial scale.

On the other hand, Japanese Patent laid open No. 56-31090 and No. 56-131404 disclose cords of 1+3 structure as a steel cord used as a belt reinforcement for the tire. In these cords, the tensile rigidity is relatively high, but the resistance to cord breakage is poor because buckling easily occurs.

SUMMARY OF THE INVENTION

It is, therefore, an object of the invention to provide a novel steel cord of 1+3 structure having an improved resistance to cord breakage and capable of expecting an improving effect in the reduction of weight and cost.

It is another object of the invention to provide a pneumatic radial tire having an excellent durability and low weight and cost by using novel steel cords of 1+3 structure having improved resistance to cord breakage.

According to a first aspect of the invention, there is the provision of a steel cord for reinforcement of elastomer articles formed by twisting three steel filaments having the same filament diameter as a sheath around a single steel filament as a core, characterized in that said three steel filaments constituting the sheath are arranged so as to satisfy conditions at a section of the sheath perpendicular to a longitudinal direction of the cord that a maximum angle of a triangle formed by connecting central points of the these filaments to each other is not less than 90° but less than 180° and an apex defining the maximum angle is always located on the same filament and a distance between the central point of this filament and the central point of the filament adjacent thereto is 1.0–1.3 times of the diameter of the filament.

According to a second aspect of the invention, there is the provision of a pneumatic radial tire comprising a radial carcass comprised of at least one carcass cord ply toroidally extending between a pair of bead cores and a belt comprised of at least one belt layer containing steel cords therein, each steel cord being formed by twisting three steel filaments having the same filament diameter as a sheath around a single steel filament as a core, characterized in that said three steel filaments constituting the sheath are arranged so as to satisfy conditions at a section of the sheath perpendicular to a longitudinal direction of the cord that a maximum angle of a triangle formed by connecting central points of the these filaments to each other is not less than 90° but less than 180° and an apex defining the maximum angle is always located on the same filament and a distance between the central point of this filament and the central point of the filament adjacent thereto is 1.0–1.3 times of the diameter of the filament.

In a preferable embodiment of the invention, the single steel filament used as a core is straight in the longitudinal direction of the cord, waved-shape on a plane in the longitudinal direction, or helical shape in the longitudinal direction. In another preferable embodiment of the invention, the steel filaments constituting the steel cord contains 0.80–0.90 wt % of carbon. That is, when the carbon content of the steel filament is increased in order to attain the weight reduction aiming at the invention, the cord strength can be increased to improve the durability of the cord itself. For example, when such steel cords are applied to the tire, the strength of the tire itself can be maintained by these cords without using the other reinforcing members. Further the amount of the cords used can be reduced, so that a weight reduction of the tire can be attained. Moreover, when these steel cords are used in the belt of the tire, it is advantageous that steel cords having a filament diameter as a sheath of 0.18–0.45 mm are used in an end count of 18–75 cords/50 mm.

BRIEF DESCRIPTION OF THE DRAWINGS

The invention will be described with reference to the accompanying drawings, wherein:

FIGS. 1 to 3 are schematically sectional views of various embodiments of the steel cord according to the invention;

FIGS. 4 and 5 are schematically sectional views of the conventional steel cords, respectively;

FIG. 6 is a graph showing a relation between compressive strain (%) and compressive stress (kgf) in the steel cord.

DESCRIPTION OF THE PREFERRED EMBODIMENTS

Figure 7:
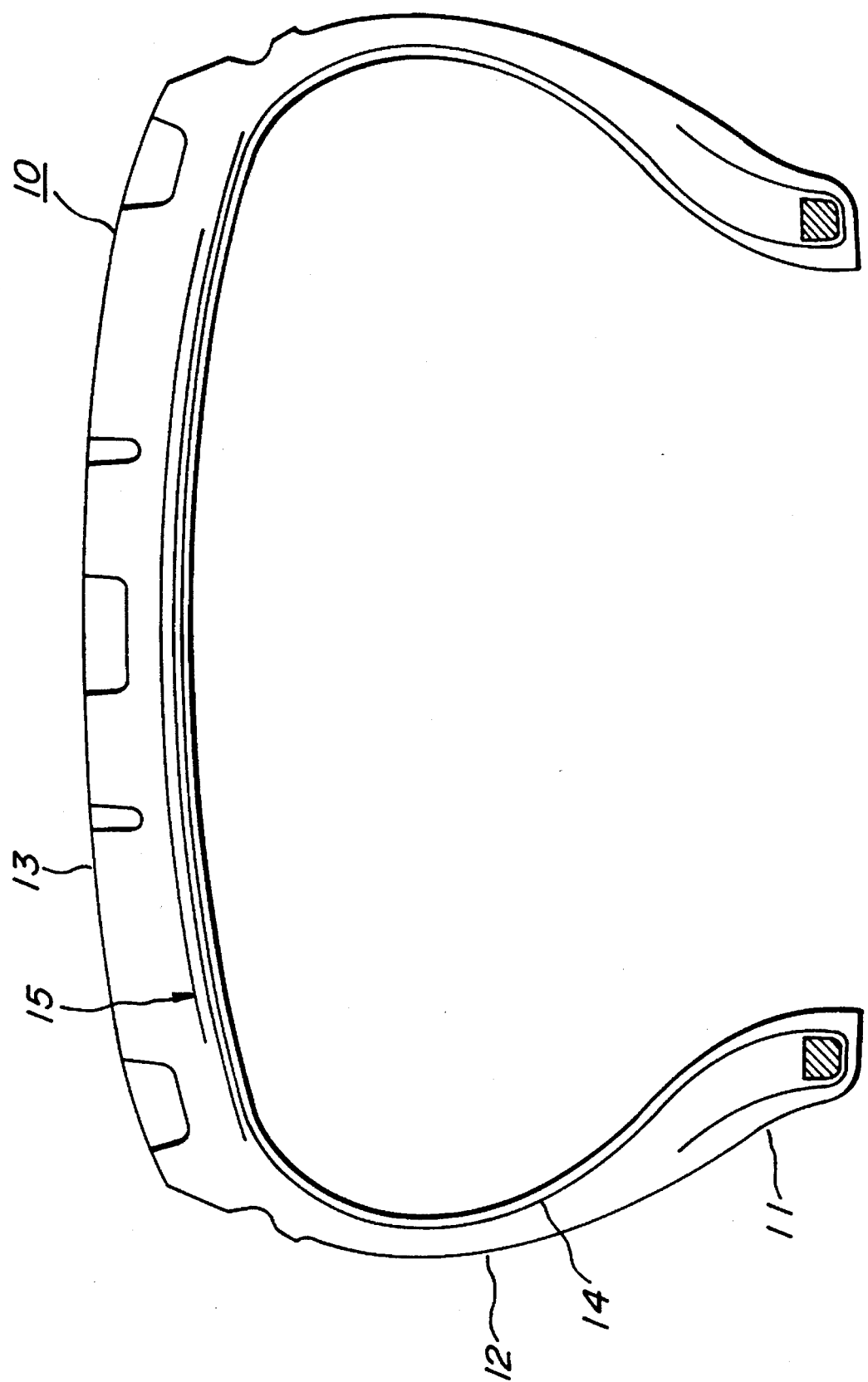
FIG. 7 is a diagrammatically sectional view of an embodiment of the pneumatic radial tire according to the invention.

In FIG. 1 is shown a first embodiment of the steel cord according to the invention, in which numeral 1 is a single steel filament as a core (hereinafter referred to as core filament) extending straight in the longitudinal direction of the cord and numerals 2, 3, 4 steel filaments constituting a sheath of the cord (hereinafter referred to as sheath filament) and having a diameter larger than that of the core filament 1. That is, the steel cord is formed by twisting these sheath filaments 2, 3, 4 around the core filament 1.

According to the invention, the sheath filaments 2–4 are arranged so as to satisfy conditions at a section of the sheath perpendicular to the longitudinal direction of the cord that a maximum angle α of a triangle formed by connecting central points 2a, 3a, 4a of the sheath filaments 2, 3, 4 to each other is not less than 90° but less than 180° and an apex defining the maximum angle is always located on the sheath filament 3 and a distance L between the central point of the sheath filament 3 and the central point of the sheath filament 2 or 4 adjacent thereto is 1.0–1.3 times of the diameter $d_s$ of the sheath filament.

According to the above arrangement of the sheath filaments, when the cord is subjected to a given forming, the phase between the sheath filaments is substantially same, whereby the resistance to cord breakage is improved.

Moreover, the diameter of the core filament is within a range of 40–85%, preferably 40–60% of the diameter ds of the sheath filament. Thus, this is favorable in order to improve the tensile rigidity of the cord and hence avoid the belt end separation.

In addition, the twisting pitch of the sheath filament is desirable within a range of 9.5–28 mm because when it is less than 9.5 mm, the economical effect is not obtained. When it exceeds 28 mm, the resistance to cord breakage lowers.

FIGS. 2 and 3 show second and third embodiments of the steel cord according to the invention, respectively, which are modified embodiments of FIG. 1. The second embodiment uses a single steel filament 5 having a wavy form viewed from in plan as the core filament, while the third embodiment uses a single steel filament 6 having a helically formed shape as the core filament. In these embodiments, the arrangement of the three sheath filaments 2, 3, 4 is the same as in the first embodiment. That is, substantially the same effects are obtained in these embodiments irrespective of the form in the core filament. Among these steel cords, the use of the steel cord shown in FIG. 3 is preferable.

Moreover, the shape of the core filament is preferable in the order of straight→wavy→helix in view of compression properties of the cord. On the other hand, the pitch of the core filament is not the same as the twisting pitch of the sheath filament, so that it is not critical.

In the production of these steel cords according to the invention, each of the three sheath filaments is subjected to a forming at a given forming ratio by means of a preformer so as to render these sheath filaments into substantially the same phase and then the thus formed sheath filaments are twisted around the core filament. Alternatively a bundle of the three sheath filaments is subjected to a forming at a given forming ratio by means of a preformer and then the thus formed bundle is twisted around the core filament. Moreover, the resulting steel cord may be subjected to a flat working through push rolls to form an ellipsoidal cord.

In the steel cord according to the invention, the reason why the maximum angle α of the triangle formed by connecting central points of the sheath filaments to each other is not less than 90° but less than 180° and the distance L between central points of the sheath filament located at the maximum angle and the sheath filament adjacent thereto is 1.0–1.3 times the diameter $d_s$ of the sheath filament is as follows.

In the conventional steel cords of 1×3 and 1+3 twisting structures as shown in FIGS. 4 and 5, when compressive bending force is applied to the cord, a large bending deformation occurs at a certain critical point as shown in FIG. 6, or a compressive buckling phenomenon is recognized. On the contrary, in case of the steel cords according to the invention, there is not recognized the buckling phenomenon as shown in FIG. 6.

In the steel cords according to the invention, the three sheath filaments are arranged as shown in FIGS. 1 to 3, whereby the phase between the sheath filaments is substantially the same, so that even when the compressive bending force is applied to the cord, these sheath filaments can absorb this force without buckling and also the core filament can be deformed following to the sheath filaments without buckling. As a result, it is considered that the steel cord according to the invention does not cause the buckling phenomenon.

However, the maximum angle of the triangle formed in the section of the cord is less than 90°, the buckling phenomenon appears likewise the conventional cords of FIGS. 4 and 5, so that it is necessary that the maximum angle should be not less than 90°.

On the other hand, the reason why the maximum angle is less than 180° is due to the fact that when it is 180° or the three sheath filaments are arranged on a straight line, the resistance to cord breakage undesirably lowers.

Furthermore, the reason why the distance L between the sheath filament located at the maximum angle and the sheath filament adjacent thereto is 1.0–1.3 times the diameter $d_s$ of the sheath filament is as follows. That is, in order to improve the resistance to cord breakage, it is advantageous to be $L=d_s$ or to adjoin the three sheath filaments to each other, but it is very difficult to contact the three twisted sheath filaments with each other in view of the production, but if the distance L is not more than 1.3 times, the same effect is substantially obtained. Therefore, the distance L is limited to the above range.

The steel cords according to the invention can be used as a reinforcement for pneumatic tires such as carcass, belt, chafer and the like. Preferably, they are used in a belt of the pneumatic radial tire according to the invention. Now, the invention will be described with respect to FIG. 7, in which numeral 10 is a typical example of the pneumatic radial tire, numeral 11 a bead portion, numeral 12 a sidewall portion, numeral 13 a tread portion, numeral 14 a carcass ply of radial structure, and numeral 15 a belt comprised of two belt layers each containing the above steel cords therein.

When the steel cords of the above structure are used in the belt 15, it is advantageous that the steel cords each having a sheath filament diameter of 0.18–0.45 mm, preferably 0.25–0.35 mm are arranged at an end count of 18–75 cords/50 mm, preferably 25–40 cords/50 mm. If the sheath filament diameter is less than 0.18 mm, in order to obtain ensure a strength of the belt required for the tire by 1+3 structure, the end count should be increased to more than 75 cords/50 mm, and hence the distance between the mutual cords becomes narrower to quicken the propagation of cracking between the cords and bring about premature failure of belt edge separation. On the other hand, if the sheath filament diameter is more than 0.45 mm or the end count is less than 18 cords/50 mm, in order to obtain a rubber conditions. Moreover, the maximum angle α and distance L between adjacent sheath filaments in the steel cord are shown by lower limit and upper limit of results measured at cord section when the cord embedded in the belt layer of the tire is optionally cut at 20 positions.

After the tire is run on a drum at a low internal pressure under a high load over 10,000 km, the cords are taken out from the tire and the number of broken cords is measured to obtain the results as shown in Table 1.

TABLE 1

|  | Comparative Example 1 | Comparative Example 2 | Acceptable Example 1 | Acceptable Example 2 | Acceptable Example 3 | Acceptable Example 4 | Acceptable Example 5 | Acceptable Example 6 |
|---|---|---|---|---|---|---|---|---|
| Twisting structure | 1 × 3 (FIG. 4) | 1 + 3 (FIG. 5) | 1 + 3 (FIG. 1) | 1 + 3 (FIG. 1) | 1 + 3 (FIG. 1) | 1 + 3 (FIG. 1) | 1 + 3 (FIG. 1) | 1 + 3 (FIG. 1) |
| Maximum angle α | — | — | 100°–115° | 90°–110° | 90°–110° | 105°–120° | 100°–115° | 95°–110° |
| Distance between adjacent sheath filaments (*) | — | — | 1.0–1.2 | 1.0–1.2 | 1.0–1.2 | 1.0–1.2 | 1.0–1.2 | 1.0–1.2 |
| Filament diameter (mm) |  |  |  |  |  |  |  |  |
| core | — | 0.25 | 0.12 | 0.12 | 0.15 | 0.25 | 0.25 | 0.25 |
| sheath ($d_s$) | 0.30 | 0.30 | 0.18 | 0.30 | 0.30 | 0.30 | 0.40 | 0.45 |
| Bending rigidity (kg · mm²) |  |  |  |  |  |  |  |  |
| core | — | 5.0 | 0.21 | 0.21 | 0.52 | 5.0 | 5.0 | 5.0 |
| sheath | 10 | 10 | 1.1 | 10 | 10 | 10 | 32 | 51 |
| Belt structure |  |  |  |  |  |  |  |  |
| end count (cords/50 mm) | 35 | 28 | 75 | 33 | 32 | 28 | 21 | 18 |
| Rubber gauge required in belt (mm) | 0.5 | 0.64 | 0.44 | 0.59 | 0.59 | 0.64 | 0.77 | 1.00 |
| Number of broken cords | 1050 | 950 | 124 | 160 | 165 | 175 | 218 | 250 |
| Belt weight (g) | 1063 | 1195 | 933 | 1147 | 1146 | 1195 | 1469 | 1732 |

(*): ratio to sheath filament diameter gauge between the belt layers required in the basic structure of the tire, it is obliged to increase the amount of rubber used in the belt and hence the tire weight considerably increases to lose the merit for the reduction of the weight.

The following examples are given in illustration of the invention and are not intended as limitations thereof.

EXAMPLE 1

Steel cords of 1+3 structure as shown in FIG. 1 are prepared as shown in Table 1 and applied to a belt comprised of two belt layers in a pneumatic radial tire for passenger car having a tire size of 175/70 R13. In this case, a first belt layer has a width of 140 mm and a second belt layer has a width of 130 mm, and the steel cords are arranged in these belt layers at a cord angle of 68° with respect to the circumferential direction of the tire. For the comparison, steel cords having structures shown in FIGS. 4 and 5 are prepared as shown in Table 1 and applied to the belt under the same

EXAMPLE 2

Steel cords of 1+3 structure as shown in FIG. 2 are prepared as shown in Table 2 and applied to a belt comprised of two belt layers in a pneumatic radial tire for passenger car having a tire size of 175/70 R13. In this case, a first belt layer has a width of 140 mm and a second belt layer has a width of 130 mm, and the steel cords are arranged in these belt layers at a cord angle of 68° with respect to the circumferential direction of the tire. Moreover, the maximum angle α and distance L between adjacent sheath filaments in the steel cord are shown by lower limit and upper limit of results measured at cord section when the cord embedded in the belt layer of the tire is optionally cut at 20 positions.

After the tire is run on a drum at a low internal pressure under a high load over 10,000 km, the cords are taken out from the tire and the number of broken cords is measured to obtain the results as shown in Table 2.

TABLE 2

|  | Acceptable Example 7 | Acceptable Example 8 | Acceptable Example 9 | Acceptable Example 10 | Acceptable Example 11 | Acceptable Example 12 |
|---|---|---|---|---|---|---|
| Twisting structure | 1 + 3 (FIG. 2) | 1 + 3 (FIG. 2) | 1 + 3 (FIG. 2) | 1 + 3 (FIG. 2) | 1 + 3 (FIG. 2) | 1 + 3 (FIG. 2) |

TABLE 2-continued

|  | Acceptable Example 7 | Acceptable Example 8 | Acceptable Example 9 | Acceptable Example 10 | Acceptable Example 11 | Acceptable Example 12 |
|---|---|---|---|---|---|---|
| Maximum angle α | 100°~115° | 90°~110° | 90°~110° | 105°~120° | 100°~115° | 95°~110° |
| Distance between adjacent sheath filaments (*) | 1.0~1.2 | 1.0~1.2 | 1.0~1.2 | 1.0~1.2 | 1.0~1.2 | 1.0~1.2 |
| Filament diameter (mm) | | | | | | |
| core | 0.12 | 0.12 | 0.15 | 0.25 | 0.25 | 0.25 |
| sheath ($d_s$) | 0.18 | 0.30 | 0.30 | 0.30 | 0.40 | 0.45 |
| Bending rigidity (kg · mm²) | | | | | | |
| core | 0.20 | 0.20 | 0.51 | 4.9 | 4.9 | 4.9 |
| sheath | 1.1 | 1.1 | 10 | 10 | 32 | 51 |
| Belt structure | | | | | | |
| end count (cords/50 mm) | 75 | 33 | 32 | 28 | 21 | 18 |
| Rubber gauge required in belt (mm) | 0.44 | 0.59 | 0.59 | 0.64 | 0.77 | 1.00 |
| Number of broken cords | 120 | 157 | 162 | 173 | 215 | 245 |
| Belt weight (g) | 933 | 1147 | 1146 | 1195 | 1469 | 1732 |

(*): ratio to sheath filament diameter

EXAMPLE 3

Steel cords of 1+3 structure as shown in FIG. 3 are prepared as shown in Table 3 and applied to a belt comprised of two belt layers in a pneumatic radial tire for passenger car having a tire size of 175/70 R13. In this case, a first belt layer has a width of 140 mm and a second belt layer has a width of 130 mm, and the steel cords are arranged in these belt layers at a cord angle of 68° with respect to the circumferential direction of the tire. Moreover, the maximum angle α and distance L between adjacent sheath filaments in the steel cord are shown by lower limit and upper limit of results measured at cord section when the cord embedded in the belt layer of the tire is optionally cut at 20 positions.

After the tire is run on a drum at a low internal pressure under a high load over 10,000 km, the cords are taken out from the tire and the number of broken cords is measured to obtain results as shown in Table 3.

TABLE 3

|  | Acceptable Example 13 | Acceptable Example 14 | Acceptable Example 15 | Acceptable Example 16 | Acceptable Example 17 | Acceptable Example 18 |
|---|---|---|---|---|---|---|
| Twisting structure | 1 + 3 (FIG. 3) | 1 + 3 (FIG. 3) | 1 + 3 (FIG. 3) | 1 + 3 (FIG. 3) | 1 + 3 (FIG. 3) | 1 + 3 (FIG. 3) |
| Maximum angle α | 100°~115° | 90°~110° | 90°~110° | 105°~120° | 100°~115° | 95°~110° |
| Distance between adjacent sheath filaments (*) | 1.0~1.2 | 1.0~1.2 | 1.0~1.2 | 1.0~1.2 | 1.0~1.2 | 1.0~1.2 |
| Filament diameter (mm) | | | | | | |
| core | 0.12 | 0.12 | 0.15 | 0.25 | 0.25 | 0.25 |
| sheath ($d_s$) | 0.18 | 0.30 | 0.30 | 0.30 | 0.40 | 0.45 |
| Bending rigidity (kg · mm²) | | | | | | |
| core | 0.20 | 0.20 | 0.51 | 4.9 | 4.9 | 4.9 |
| sheath | 1.1 | 10 | 10 | 10 | 32 | 51 |
| Belt structure | | | | | | |
| end count (cords/50 mm) | 75 | 33 | 32 | 28 | 21 | 18 |
| Rubber gauge required in belt (mm) | 0.44 | 0.59 | 0.59 | 0.64 | 0.77 | 1.00 |
| Number of broken cords | 115 | 155 | 160 | 170 | 213 | 240 |
| Belt weight (g) | 933 | 1147 | 1146 | 1195 | 1469 | 1732 |

(*): ratio to sheath filament diameter

As mentioned above, according to the invention, the durability to compressive deformation applied to the steel cord for the reinforcement of elastomer articles is considerably improved, so that the durability of the elastomer article using such steel cords can also be improved. Particularly, when these steel cords are applied to the pneumatic radial tire frequently subjected to compressive deformation, the durability of the tire can naturally be improved, and also the reduction of tire weight and cost can be attained.

What is claimed is:

1. A steel cord for reinforcement of elastomer articles formed by twisting only three steel filaments having the same filament diameter defining a sheath around a single steel filament defining a core, said single core filament having a diameter smaller than said diameter of a filament forming said sheath; characterized in that said three steel filaments constituting the sheath are arranged so as to satisfy conditions at a section of the sheath perpendicular to a longitudinal direction of the cord that a maximum angle of a triangle formed by connecting central points of the three sheath filaments to each other is not less than 90° but less than 180° and an apex defining the maximum angle is always located on the same filament and a distance between the central point of this filament and the central point of the sheath filament adjacent thereto is 1.0–1.3 times of the diameter of the sheath filament.

2. The steel cord according to claim 1, wherein said steel filament as a core is straight in the longitudinal direction of the cord.

3. The steel cord according to claim 1, wherein said steel filament constituting said steel cord contains 0.80–0.90 wt % of carbon.

4. The steel cord according to claim 1, wherein said steel filament as a core has a diameter corresponding to 40–85% of said diameter of one filament used as a sheath.

5. The steel cord according to claim 1, wherein said three steel filaments as a sheath are twisted at a twisting pitch of 9.5–28 mm.

6. The steel cord according to claim 1, wherein said steel filament as a core is waved-shaped on a plane in the longitudinal direction.

7. The steel cord according to claim 1, wherein said steel filament as a core is helical shaped in the longitudinal direction.

* * * * *